United States Patent [19]

Stachowiak et al.

[11] Patent Number: 4,965,327

[45] Date of Patent: Oct. 23, 1990

[54] SYNTHESIS OF POLYDIENE RUBBER BY HIGH SOLIDS SOLUTION POLYMERIZATION

[75] Inventors: Robert W. Stachowiak, Akron; Anthony J. Puccio, Tallmadge; Thomas J. Eberhart, Cuyahoga Falls, all of Ohio

[73] Assignee: The Goodyear Tire & Rubber Company, Akron, Ohio

[21] Appl. No.: 425,655

[22] Filed: Oct. 23, 1989

[51] Int. Cl.$^5$ .......................... C08F 2/06; C08F 36/06; C08F 36/08

[52] U.S. Cl. ......................................... 526/88; 526/64; 526/173; 526/180; 526/335; 526/337; 526/340; 526/340.2

[58] Field of Search ................. 526/88, 173, 339, 340, 526/918, 335, 337, 340.2, 64

[56] References Cited

U.S. PATENT DOCUMENTS

| | | | |
|---|---|---|---|
| 3,770,710 | 11/1973 | Futamura | 260/83.7 |
| 3,780,139 | 12/1973 | Sutter et al. | 526/88 X |
| 4,189,555 | 2/1980 | Massoubre | 526/173 X |
| 4,736,001 | 4/1988 | Carbonaro et al. | 526/63 |
| 4,859,748 | 8/1989 | Priddy et al. | 526/88 |

FOREIGN PATENT DOCUMENTS 2594440  2/1987  France ................... 526/88

Primary Examiner—Joseph L. Schofer
Assistant Examiner—F. M. Teskin
Attorney, Agent, or Firm—Alvin T. Rockhill

[57] ABSTRACT

Synthetic elastomers are typically made commercially by employing emulsion polymerization or solution polymerization techniques. In such solution polymerization techniques, it is desirable to operate at the highest solids content which is practical. As a general rule, it is not practical to prepare such rubbers by solution polymerization at solids contents of higher than about 20 percent. However, the subject invention reveals a technique for preparing such rubbers by high solids solution polymerization at extremely high solids contents. This technique offers substantial advantages associated with eliminating large quantities of organic solvents. The subject invention more specifically relates to a process for the synthesis of polyidene rubber by continuous high solids polymerization which comprises: (1) continuously charging at least one diene monomer, at least one organolithium compound, and from about 4 to about 50 phm of at least one organic solvent into a reaction zone; (2) allowing the monomers to polymerize to a conversion of at least about 90% while utilizing conditions under which there is sufficient evaporative cooling in said reaction zone to maintain a temperature within the range of about 10° C. to about 150° C.; and (3) continuously withdrawing said polydiene rubber from the reaction zone.

19 Claims, No Drawings

SYNTHESIS OF POLYDIENE RUBBER BY HIGH SOLIDS SOLUTION POLYMERIZATION

BACKGROUND OF THE INVENTION

Many types of polymerization processes are used in the preparation of synthetic polymers. For example, the polymerization of a monomer into a polymer can be conducted in a number of different types of reaction systems, including suspension polymerization systems, emulsion polymerization systems, solution polymerization systems, and bulk polymerization systems. Each of these systems has certain advantages and disadvantages.

In suspension polymerization systems, the initiator (catalyst) is dissolved in the monomer, the monomer is dispersed in water, and a dispersing agent is incorporated to stabilize the suspension formed. All suspension polymerization processes use some type of surfactant to keep the monomer globules dispersed during the reaction in order to avoid coalescence and agglomeration of the polymer. Not only does the suspension stabilizer affect the particle size and shape, but also the clarity, transparency, and film-forming properties of the resultant polymer. A variety of dispersing agents including water-insoluble, finely divided, inorganic materials and organic materials, depending upon the monomer to be polymerized, have been used as dispersing agents. Thus, for example, talc, barium, calcium, and magnesium carbonates, silicates, phosphates and sulfates, as well as poly(vinylalcohol), salts of styrene-maleic anhydride copolymers, vinyl acetate-maleic anhydride copolymers, starch, gelatin, pectin, alginates, methyl cellulose, carboxymethyl cellulose, bentonite, limestone and alumina have been used as suspending agents. A major advantage of suspension polymerization is that the polymeric products are obtained in the form of small beads which are easily filtered, washed, and dried. Water is a much more desirable diluent and heat-transfer medium than most organic solvents.

However, in certain polymerization processes, for example, the preparation of very high cis-1,4-polybutadiene, while utilizing nickel catalyst systems the presence of moisture is highly undesirable. Thus, suspension polymerization in a water medium is not an effective process for the synthesis of very high cis-1,4-polybutadiene utilizing nickel catalyst systems.

An emulsion polymerization process is considered to be a three-phase reaction system consisting of large droplets of the monomer, the aqueous phase containing the dissolved initiator and the colloidal particles of monomer-swollen polymer. While the emulsion polymerization process has the economic advantage of using water as the emulsion base, not all polymerization processes can tolerate the presence of water. Such is the case with the polymerization of butadiene into very high cis-1,4-polybutadiene using nickel catalyst systems. In order to recover dry polymers which are prepared by emulsion polymerization, it is, of course, necessary to coagulate the rubber from the latex. Coagulation is generally accomplished by adding a combination of salt and acid to the latex. This results in the formation of waste water which can present environmental problems.

In solution polymerization, an organic solvent is used which is capable of dissolving the monomer, the polymer, and the polymerization catalyst or initiator. Inasmuch as the polymer is soluble in the organic solvent which is used, there is a tendency for the viscosity of the solution to increase as the molecular weight of the polymer increases. If this continues over a period of time, the solution becomes too viscous to handle in conventional polymerization reaction systems unless the solids content is limited to a low level. In commercial polymerization processes, it is desirable to obtain a polymerization mass which has a high concentration of solid polymer and, at the same time, comprises a material which is easy to handle and does not agglomerate on the walls of the reaction vessel utilized. The polymeric solution is generally steam stripped in order to remove the solvent and unreacted monomer. The aqueous slurry of crumb rubber is usually pumped to a skimming tank, a water expeller and an extruder dryer in order to remove the water. The steam stripping and drying operations consume a large amount of expensive energy.

In nonaqueous dispersion polymerizations, an organic medium is utilized which is a very poor solvent for the polymer being produced. A dispersing agent is utilized in the organic medium in order to disperse the polymer being formed throughout the medium. The dispersing agents (dispersion stabilizers) which are utilized in such nonaqueous dispersion polymerizations are generally polymeric materials which can be block copolymers, random copolymers, or homopolymers. Nonaqueous dispersion polymerizations are described in detail in U.S. Pat. No. 4,098,980 and U.S. Pat. No. 4,452,960. Nonaqueous dispersion polymerization processes offer several distinct advantages over solution polymerizations and emulsion polymerizations including improved heat transfer, higher polymer concentrations in the reaction medium, increased production capacity, and energy savings.

Bulk polymerization is the direct conversion of liquid monomers to polymer. Such bulk polymerizations are generally carried out by the addition of an initiator to a simple homogeneous system containing one or more monomers. The polymers produced in such bulk polymerizations can be but are not necessarily soluble in their own monomers which are in effect utilized as the reaction medium. For example, polyisoprene is fairly soluble in isoprene and polypentadiene is fairly soluble in 1,3-pentadiene, but high cis-1,4-polybutadiene is not very soluble in 1,3-butadiene monomer. The synthesis of polystyrene by the addition of a free radical initiator to styrene monomer is a good example of a very common bulk polymerization. The principal advantage of a bulk polymerization process is that no solvent is utilized. Thus, the cost of solvent recovery and recycle is eliminated. One disadvantage of bulk polymerization reactions is that it is difficult to control the reaction temperature during polymerization. In fact, attempts to bulk polymerize many types of monomers have resulted in the reaction getting totally out of control. Due to this difficulty, bulk polymerization has not been widely utilized in the commercial preparation of synthetic rubbers.

The concept of preparing synthetic rubbers by bulk polymerization is not new. It has been known for many years that diene monomers can be polymerized into synthetic rubbers in the absence of a solvent. In fact, the Germans and Russians synthesized polybutadiene and polydimethylbutadiene in bulk during World War II using alkali metal catalysts in a batch process. French Pat. No. 8,702,167 discloses a process for the bulk polymerization of 1,3-butadiene monomer into high cis-1,4- polybutadiene. The process disclosed in French Pat. No. 8,702,167 more specifically involves:

(1) charging into a reaction zone the 1,3-butadiene: a catalyst system comprising (a) an organoaluminum compound, (b) a soluble nickel containing compound, and (c) a fluorine containing compound;

(2) allowing the 1,3-butadiene to polymerize into high cis-1,4-polybutadiene to a conversion of at least about 60 percent while utilizing conditions under which there is sufficient evaporative cooling in said reaction zone to maintain a temperature within the range of 10° C. to 130° C.: and (3) continuously withdrawing said high cis-1,4-polybutadiene from said reaction zone. In order to reduce the molecular weight of the high cis-1,4polybutadiene, the polymerizations of French Pat. No. 8,702,167 can be conducted in the presence of at least one molecular weight regulator selected from the group consisting of α-olefins, cis-2-butene, trans-2-butene, allene, 1,4-pentadiene, 1,5-hexadiene, 1,6-heptadiene, 1,2,4-trivinylcyclohexene, 4-vinyl-1-cyclohexene, 1-trans-4-hexadiene, and hydrogen. The reaction zone utilized in such techniques can be a self-cleaning extruder-reactor.

The possibility of preparing synthetic rubbers through bulk polymerization is an attractive possibility. This is because it would eliminate the need for utilizing solvents which must be separated from the rubber and recycled or otherwise disposed of. The cost of recovery and recycle of solvent adds greatly to the cost of the rubber being produced and can cause certain environmental problems. Recovery and separation of the rubber from the solvent also requires additional treatment and equipment, all of which further increase the cost of the rubber. The purification of solvents being recycled can also be very expensive and there is always the danger that the solvent may still retain impurities which will poison the polymerization catalyst. For example, benzene and toluene can form arene complexes with the catalyst which inhibit polymerization rates and which can result in the formation of polymers having lower molecular weights.

Even though bulk polymerization offers many substantial advantages, it cannot be utilized in conjunction with lithium catalyst systems. In other words, a satisfactory means for synthesizing synthetic rubbers with lithium catalysts is not available. Heretofore, synthetic rubbers prepared with lithium catalyst systems have been made by solution polymerization. Unfortunately, such solution polymerizations require the use of large amounts of organic solvent. This is because it is extremely difficult to prepare such synthetic rubbers on a commercial basis at solids contents of greater than about 20%. In commercial solution polymerization techniques solids contents within the range of 15% to 18% are typically employed. Even though numerous attempts have been made to reduce the amount of organic solvent required in such solution polymerizations, all such attempts have heretofore been unsuccessful.

SUMMARY OF THE INVENTION

By utilizing the high solids solution polymerization technique of the present invention, polydiene rubbers having solids contents in excess of 50% can be prepared. In fact, solution rubbers can be prepared which have solids contents in excess of 90%. Numerous distinct and highly beneficial advantages are realized by practicing the high solids solution polymerizations of the present invention. The principal advantage of such high solids solution polymerizations is that very little solvent is utilized. Thus, the cost of solvent recovery and recycle is greatly reduced. Also, very fast residence times within the range of about 1 minute to about 10 minutes can be attained which allows for smaller sized equipment without reducing throughputs.

The subject invention more specifically reveals a process for the synthesis of polydiene rubber by continuous high solids polymerization which comprises: (1) continuously charging at least one diene monomer, at least one organolithium compound, and from about 4 to about 50 phm of at least one organic solvent into a reaction zone: (2) allowing the monomers to polymerize to a conversion of at least about 90% while utilizing conditions under which there is sufficient evaporative cooling in said reaction zone to maintain a temperature within the range of about 10° C. to about 150° C.; and (3) continuously withdrawing said polydiene rubber from the reaction zone.

DETAILED DESCRIPTION OF THE INVENTION

The polydiene rubbers which can be prepared utilizing the techniques of the present invention are organolithium-initiated polymers of at least one diolefin monomer. The diolefin monomers utilized in the preparation of such polymers normally contain from 4 to 12 carbon atoms with those containing from 4 to 8 carbon atoms being more commonly utilized. The diolefin monomers used in such polydiene rubbers are normally conjugated diolefins.

The conjugated diolefin monomers which are utilized in the synthesis of such polydiene rubbers generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Feed stocks which are comprised of one or more conjugated diolefin monomers in admixture with other low molecular weight hydrocarbons can be utilized. Such admixtures, termed low concentration diene streams, are obtainable from a variety of refinery product streams, such as naptha-cracking operations or can be intentionally blended compositions. Some typical examples of low molecular weight hydrocarbons which can be admixed with diolefin monomers, such as 1,3-butadiene, in the polymerization feed include propane, propylene, isobutane, n-butane, 1-butene, isobutylene, trans-2-butene, cis-2-butene, vinylacetylene, cyclohexane, ethylene, propylene, and the like.

Polydiene rubbers having high vinyl contents which are copolymers or terpolymers of diolefin monomers with one or more other ethylenically unsaturated monomers can also be prepared utilizing the high solids solution polymerization techniques of this invention. Some representative examples of ethylenically unsaturated monomers that can potentially be synthesized into such high vinyl polymers include alkyl acrylates, such as methyl acrylate, ethyl acrylate, butyl acrylate, methyl methacrylate and the like; vinylidene monomers having one or more terminal $CH_2$—CH-groups: vinyl aromatics such as styrene, α-methylstyrene, bromostyrene, chlorostyrene, fluorostyrene and the like: α-olefins such as ethylene, propylene, 1-butene, and the like: vinyl halides, such as vinylbromide, chloroethane (vinylchloride), vinylfluoride, vinyliodide, 1,2-dibromoethene, 1,1-dichloroethene (vinylidene chloride), 1,2-dichloroethene, and the like: vinyl esters, such as vinyl acetate: α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide and the like.

Polydiene rubbers which are copolymers of one or more diene monomers with one or more other ethylenically unsaturated monomers will normally contain from about 50 weight percent to about 99 weight percent diene monomers and from about 1 weight percent to about 50 weight percent of the other ethylenically unsaturated monomers in addition to the diene monomers. For example, copolymers of diene monomers with vinylaromatic monomers, such as styrene-butadiene rubber (SBR) which contain from 50 to 95 weight percent diene monomers and from 5 to 50 weight percent vinylaromatic monomers are useful in many applications.

Vinyl aromatic monomers are probably the most important group of ethylenically unsaturated monomers which are commonly incorporated into polydienes. Such vinyl aromatic monomers are, of course, selected so as to be copolymerizable with the diolefin monomers being utilized. Generally, any vinyl aromatic monomer which is known to polymerize with organolithium initiators can be used. Such vinyl aromatic monomers typically contain from 8 to 20 carbon atoms. Usually the vinyl aromatic monomer will contain from 8 to 14 carbon atoms. The most widely used vinyl aromatic monomer is styrene. Some examples of vinyl aromatic monomers that can be utilized include 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and the like.

The relative amount of conjugated diene or dienes and monovinyl aromatic compound or compounds employed can vary over a wide range. In preparing rubbery polymers, the proportion of the conjugated diene versus the monovinyl-substituted aromatic compound should be sufficient so as to result in a substantially rubbery or elastomeric copolymer product. There is no sharp break point as to the amount of conjugated diene versus monovinyl-substituted aromatic compound that confers rubbery or elastomeric properties on the resulting copolymer, though in general at least 50 parts by weight of conjugated diene are required on an exemplary basis. Thus, for a rubbery copolymer, as is preferred in accordance with this invention, the weight ratio of conjugated diene to monovinyl aromatic compound in the monomer charge would be in the range of about 50:50 to 95:5. Of course, mixtures of conjugated dienes as well as mixtures of monovinyl-substituted aromatic compounds can be utilized.

The organic solvent utilized in the process of this invention can be one or more aromatic, paraffinic, or cycloparaffinic compounds. These solvents will normally contain from 4 to 10 carbon atoms per molecule and will be liquids under the conditions of the polymerization. Some represent examples of suitable organic solvents include pentane, isooctane, cyclohexane, normal hexane, benzene, toluene, xylene, ethylbenzene, and the like, alone or in admixture. Cyclohexane and normal hexane are preferred organic solvents. A gel inhibitor, such as 1,2-butadiene or allene, can be included in the organic solvent to inhibit gel formation.

The organolithium initiators employed in the process of this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions having a functionality which may be regulated.

The amount of organolithium initiator utilized will vary with the monomers being polymerized and with the molecular weight that is desired for the polymer being synthesized. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a sec- or tert-organomonolithium compound with 1,3-butadiene, on a ratio of such as about 2 to 4 moles of organomonolithium compound per mole of 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by R (Li)$_x$ wherein R represents a hydrocarbyl radical of such as 1 to 20 carbon atoms per R group, and x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane' 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The monomers, organo lithium compound and organic solvent are continuously charged into the reaction zone. The quantity of monomers, organo lithium compound and organic solvent charged into the reaction zone per unit time is essentially the same as the quantity of the polydiene rubber withdrawn from the reaction zone per unit time. These quantities will, of course, depend upon the size of the reaction zone and the reaction rate which is attained. The amount of organic solvent charged into the reaction zone will be within the range of about 4 to about 50 phm (parts per hundred parts of monomer). The optimum amount of organic solvent will depend upon the type of polydiene rubber being prepared.

In cases where polybutadiene homopolymer is being prepared from about 20 to about 50 phm of the organic solvent will be charged into the reaction zone. In the synthesis of polybutadiene homopolymer, it is preferred to charge from about 30 to about 45 phm of the organic solvent. In the synthesis of polyisoprene homopolymer, generally from about 10 to about 30 phm of the organic solvent will be charged with it being preferred to charge from about 15 to about 25 phm of the organic solvent. In the preparation of styrene-butadiene rubbers (SBR), generally from about 20 to about 40 phm of the organic solvent will be charged with it being preferred to charge from about 25 to about 30 phm of the organic solvent. In the synthesis of isoprene-butadiene copolymers, generally from about 10 to about 30 phm of the organic solvent will be charged with it being preferred to charge from about 15 to about 25 phm of the organic solvent. In the synthesis of styrene-isoprene copolymers, generally from about 5 to about 20 phm of the organic solvent will be charged with it being preferred to charge from about 6 to about 15 phm of the organic solvent. In the synthesis of styrene-isoprene-butadiene rubbers (SIBR), normally from about 4 to about 20 phm of the organic solvent will be charged with it being preferred to charge from about 6 to about 15 phm of the organic solvent into the reaction zone.

The reaction zone is constructed in such a way so as to provide constant agitation to its contents. It will also be constructed in a manner that will provide a means for sufficient evaporative cooling to maintain a temperature within the reaction zone of from about 10° C. to about 150° C. Finally, a means for transporting the polydiene rubber from the reaction zone will be included in the design of the reaction zone.

A reactor/extruder which is equipped with a means of reflux condensation can be designed so as to provide a good reaction zone. The screws and/or paddles within the extruder reactor provide agitation for the 1,3-butadiene monomer, the catalyst system, and the organic solvent regulator utilized in the polymerization. The screws also provide a means for transporting the rubber produced from the reaction zone. Paddles can also be designed to push the polybutadiene being produced from the reaction zone. A means for evaporative cooling is required since it has been determined that a cooling jacket around the reaction zone is insufficient for heat control. The means for evaporative cooling can simply be one or more reflux columns. The condensate formed in the process of providing evaporative cooling can be allowed to simply return into the reaction zone, or it can be removed for recycle. It will normally not be necessary to purify the condensate.

Evaporative cooling is a very effective means of temperature control. For example, the energy required to vaporize liquid butadiene is very substantial (99.8 cal/g). It is also a self-regulating temperature control system since as temperatures get higher, there will be more evaporation, and thus, more cooling. This is the reason that evaporative cooling is sometimes referred to as autorefrigeration. An inert gas or nitrogen can be utilized to control the pressure within the reaction zone which in turn controls the amount of evaporative cooling that will occur. The pressure within the reaction zone will, of course, be controlled within a range that allows for at least some of the monomers within the reaction zone to be present in both the liquid state and as a vapor.

It is important for the reaction zone to be designed in a way that provides for self-cleaning. Such designs generally utilize a self-wiping action to clean the sides of the reactor, the paddles, and the extruder screws. Reactor/extruders that are equipped with multiple rotating shafts (screws and/or paddles) can be designed to be self-cleaning. Reactor/extruders which are equipped with intermeshing, co-rotating twin-screws provide such a self-cleaning action and can be designed so as to have a self-cleaning effect of approximately 90% or more. For that reason, they are an excellent choice for utilization in the high solids solution polymerizations of the present invention. Such reactor/extruders which are equipped with twin-screws also provide adequate agitation for the reactants as well as an excellent means for transporting the polybutadiene produced from the reaction zone.

The reaction zone will also be designed so as to provide an appropriate residence time. It will, of course, be advantageous to minimize residence times in order to maximize throughput. However, it will normally not be desirable to decrease residence times to the extent that it causes a drop in conversion of monomer to polymer. The optimal residence time will vary with the type of catalyst being utilized. For instance, it is possible to maintain shorter residence times in the reaction zone in cases where highly active catalyst systems are used than it is in cases where less active catalysts are utilized. It will normally be possible to adjust residence times in the reaction zone by controlling the rate at which the rubber being produced is transported from the reaction zone. It has been determined that very short residence times can be satisfactorily maintained and that the amount of free monomer in the reaction zone can be kept at a very low level. For example, the residence time utilized in the reaction zone will generally be from about 1 minute to about 10 minutes with a residence time of about 2 minutes to about 5 minutes being used in most cases.

Since the bulk polymerization reaction is carried out under pressures greater than those outside of the reactor, it is normally desirable to design the reaction zone in a manner that will cause the rubber exiting the reaction zone to plug the exit so as to prevent unpolymerized monomer from escaping. Alternatively, a mechanical apparatus, such as a restrictor valve, can be utilized to keep the reactants from escaping out of the reaction zone. Such a mechanical device can also be helpful during the start-up of the bulk polymerization process. During start-up, it is also possible to plug the exit of such extruder reactors with the rubber being produced or some other suitable elastomeric material in order to hold back the reactants until enough new rubber is generated to accomplish this purpose.

Since the rubber being produced is essentially a solid material which contains only a small amount of solvent, it will normally not be possible to transport it from the reaction zone with standard gear pumps. In very simplistic terms, a means for pushing the rubber formed from the reaction zone will normally be required. This is in contrast to a means for transporting a solution or suspension of polymer from the reaction zone which is based on a pulling or pumping type of action. Reactor/extruders clearly provide the kind of pushing action necessary in order to transport the rubber produced from the reaction zone.

The reactors used in the practice of this invention will normally contain at least three distinct zones. These zones are the feed zone, the reaction zone, and the transport zone. The monomer, organo lithium compound and organic solvent are generally charged into the feed zone. The feed zone normally contains two or more co-rotating screws which quickly push the monomer and catalyst into the reaction zone. Thus, only a minimal amount of polymerization takes place in the feed zone. The polymerization is substantially completed in the reaction zone. The reaction zone contains screws, paddles, or some other type of agitators that will provide mixing and expose the polymerizing material to evaporative cooling. Co-rotating agitators having a lens-shaped cross sectional design have been found to be good for this purpose. Such lens-shaped agitators provide sufficient free reactor volume to allow for adequate vapor disengagement from the polymerization mass. This free reactor volume is not provided by standard screws. The reaction zone is normally designed so as to be a neutral pumping region or so as to provide only a minimal amount of pumping action which pushes the rubber being synthesized from the reaction zone into the transport zone. The transport region is designed to pull the polymer produced from the reaction zone. Co-rotation multiple screws are very effective for this purpose.

The reactor used can optionally contain a discharge zone. The discharge zone is designed to take the rubber being produced from the transport region. It is also designed in a manner so that there is no back mixing into the transport region. A single screw works well in the discharge zone. Since there is no back mixing in the discharge zone, it is an advantageous point at which to add a short stop to the polymer. Other rubber chemicals, such as coupling agents, shortstops and/or antioxidants can also be added to the rubber in the discharge zone.

As has been pointed out, the temperature within the reaction zone is regulated by evaporative cooling within a range of from about 10° C. to about 150° C. Normally, however, it is preferred to utilize a temperature within the range of 50° C. to 140° C. The most preferred temperature for carrying out the bulk polymerization reaction is 60° C. to 100° C.

Flow rates into and out of the reaction zone are adjusted so as to attain a monomer conversion of at least about 90 percent. It is normally preferred to attain a conversion of at least 96 percent with conversion in excess of 98 percent being most preferred.

As the rubber is exiting the reaction zone, it can be desirable to add shortstops, antidegradants, and/or other conventional rubber chemicals to it in the discharge zone. Mixing such rubber chemicals into the polybutadiene can be facilitated by first dissolving them in a processing oil or mineral oil if an oil extended rubber is being prepared. Rosin acids and tall oils (abietic acids) are generally soluble in processing or mineral oils and function as shortstops. In cases where tread rubber is being prepared, from about 1 to about 10 weight percent of the processing oil can be mixed into the rubber In situations where the rubber being made is to be utilized in tire white sidewalls, then about 1 to 3 percent of a mineral oil can generally be added. In any case, an adequate amount of extending oil can be added to facilitate the process of distributing the desired rubber chemicals throughout the rubber. In cases where large quantities of a processing or mineral oil are being added, it will normally be advantageous to utilize multiple co-rotating screws in order to insure adequate mixing. However, measures should be taken to prevent back mixing of the oil into the reaction zone. It is, of course, also possible to add rubber chemicals which are dissolved in an organic solvent, such as hexane, to the polymer.

After the rubber has exited the reaction zone it may be necessary to devolatilize it. This can normally be accomplished by repetitively subjecting the rubber to elevated temperatures and reduced pressures. This devolatilization process can be continued for as many cycles as are required to reduce the volatile materials in the rubber to acceptable levels. It will normally be desirable to reduce the amount of volatile organic compounds present to less than 10 ppm.

This invention is illustrated by the following examples which are merely for the purpose of illustration and are not to be regarded as limiting the scope of the invention or the manner in which it can be practiced. Unless specifically indicated otherwise, parts and percentages are given by weight.

Example 1

A reactor/extruder unit containing two parallel agitator shafts arranged in an over/under fashion was utilized in this experiment. Both agitators were 4 in. (10.2 cm) in diameter and were anchored by a pair of tapered thrust bearings and entered the reactor through hydraulically pressured oil seals. The 32 in. (81 cm) and 48 in. (122 cm) long shafts were made of four regions. The first region was an 8 in. (20 cm) long transport region with tight deep flights at the rear of each agitator which efficiently conveys material downstream, away from the oil seal face toward the reaction zone. The second region was a 21 in. (53 cm) long reaction zone. This section was composed of 21-1 in. (2.54 cm) wide paddles keyed onto a shaft with each paddle orientation being offset 15° from the preceding paddle. This design results in a gradual 360° single helix on each agitator along the length of the 21 in. (53.3 cm) reaction zone. The third region which acted as the transport zone contained a short 3 in. (7.6 cm) long deeply grooved flight. It transported the polymer being produced away from the reaction zone. The fourth region which acted as a discharge zone was comprised of a single 16 in. (40.6 cm) long, 2 in. (5.1 cm) diameter discharge screw with a shallow single flight which was 0.09 in. (0.23 cm) deep. This single screw was attached directly to the lower of the agitator shafts. The top agitator shaft extended through the transport region, the reaction zone, and the transport zone: but did not extend into the discharge zone.

The reactor/extruder was designed so that the agitators would wipe polymer from the reactor walls and the other agitator. The reactor itself is housed by a two-compartment jacket and a third jacket encompasses the single discharge screw. The two reactor jacket segments were coupled and connected to a refrigerant coolant/steam heat exchanger which allowed for temperature control between 25° F. ($-4°$ C.) and 250° F. (121° C.). This capacity was only used for heating during start-up and cooling during shut-down. The single screw jacket was linked directly to a refrigerant supply and only had cooling capabilities. Some cooling was required during operation to remove the heat which resulted from the mechanical work input by the single discharge screw in the discharge zone. The reaction zone had a volume of 6 liters, approximately 4 liters of which served as actual working volume to allow for a 2 liter vapor space in the reactor. The unit was driven by a variable speed belt drive powered by a 10 horsepower motor. Power draw was monitored with an in-line watt meter. The drive was capable of delivering from 29 rpm to 230 rpm. The internal temperature was monitored at four points along the reactor with thermocouples mounted flush with the reactor interior walls. A gauge fitted at the die flange allowed for extruder pressure to be monitored. A mechanical ball valve was installed at the end of the discharge zone so that the exit orifice could be throttled or completely closed.

A key component of the reactor/extruder used in this experiment was its reflux cooling capacity which was capable of removing the 622 BTU of heat generated per pound of polybutadiene produced (18.7 kcal/mole). This cooling capacity was provided by condensation cooling. Its design allowed for vapors to be condensed and returned to the reaction zone at a rate equivalent to their generation.

The reactor/extruder was used in making polybutadiene in a continuous process. An average of 20.1 pounds (9.1 kg) per hour of 1,3-butadiene monomer and 9.9 pounds (4.5 kg) per hour of n-hexane was charged into the reactor/extruder. Normal-butyllithium was also continuously charged into the feed zone of the reactor/extruder at a level of 0.058 phm. The polymerization was conducted utilizing a reflux temperature of 160° F. (71° C.) at a pressure of 110 psig ($8.6 \times 10^5$ Pascals).

The polymer production rate was constant, but mechanically limited to approximately 22 lbs. (10 kg) per hour. A shortstop was added at a level of 1 phm and 1 phm of Wingstay ® K was added as an antioxidant. A monomer conversion of greater than 98% was realized. With the devolatilizer operating at 325° F. (163° C.) and 125 mm vacuum ($1.67 \times 10^4$ Pascals), residual hexane levels were approximately 3%.

The polybutadiene produced was determined to have a Mooney viscosity (M/L-4) of 70, a dilute solution viscosity of 2.99, a glass transition temperature of $-94.2°$ C. and a vinyl content of 11.4%. The rubber made was also determined to contain 1.89% extractables, 0.21% volatiles and 0.03% ash.

EXAMPLE 2

In this experiment styrene-butadiene rubber was synthesized by high solids solution polymerization using the same equipment and generally the same procedure as is described in Example 1. The monomer charge utilized in this experiment contained 19 weight percent styrene monomer and 81 weight percent 1,3-butadiene monomer. A monomer concentration of 65% was employed. Accordingly, 22.8 lbs. (10.3 kg) of monomers and 12.2 lbs. (5.5 kg) of n-hexane solvent were continuously charged into the reactor/extruder. Normal-butyl lithium was employed as the catalyst at a concentration of 0.061 phm. The polymerization was conducted utilizing a reflux temperature of 164° F. (73° C.) and a pressure of 110 psig (8.6×10⁵ Pascals).

A monomer conversion in excess of 98% was attained. The SBR produced had a Mooney viscosity of 69, a dilute solution viscosity of 1.92, and a glass transition temperature of −90.6° C. It was determined that the SBR contained 17.8 weight percent styrene and had a vinyl content of 9.3%. The SBR made contained 1.99% extractables, and no measurable ash.

EXAMPLE 3

In this experiment the general procedure described in Example 2 for preparing SBR was employed. However, in this experiment a monomer concentration of 75% was employed. Accordingly, 26.2 lbs. (11.9 kg) per hour of the monomers were continuously charged into the reactor with 8.8 lbs. (4 kg) per hour of n-hexane solvent. In this experiment a reflux temperature of 163° F. (73° C.) and a catalyst level of 0.063 phm of n-butyl lithium were employed.

A monomer conversion in excess of 98% was realized. The Mooney viscosity of the SBR produced was 80%. It had a dilute solution viscosity of 1.7, a glass transition temperature of −98.6° C., and a vinyl content of 9.8%. It was determined that the SBR produced contained 18.7% bound styrene.

EXAMPLES 4–7

In this series of experiments, polyisoprene was prepared utilizing the equipment and general technique described in Example 1. The operating conditions utilized in the polymerization and the properties of the polyisoprene produced are reported in Table I.

TABLE I

| Example | 4 | 5 | 6 | 7 |
|---|---|---|---|---|
| Monomer Concentration | 80% | 80% | 80% | 80% |
| Startup Temperature | 180° F. | 180° F. | 180° F. | 180° F. |
| Reflux Pressure, psig | 50 | 50 | 50 | 50 |
| Reflux Temperature | 199° F. | 198° F. | 197° F. | 197° F. |
| Lbs. Premix/Hour | 50.0 | 50.0 | 50.0 | 50.0 |
| Lbs. Monomer/Hour | 40.0 | 40.0 | 40.0 | 40.1 |
| n-Butyllithium, phm | 0.029 | 0.029 | 0.035 | 0.024 |
| Modifier, TMEDA, phm | 0.0 | 0.015 | 0.030 | 0.0 |
| Monomer Conversion, % | 98+ | 98+ | 97 | 98+ |
| Mooney (M/L-4) | 39 | 37 | 21 | 67 |
| DSV Gel, % | 3.11 | 0.86 | 1.91 | 6.31 |
| DSV | 3.17 | 2.71 | 2.23 | 3.59 |
| Extractables, % | 1.32 | 1.67 | 1.77 | 1.60 |
| Volatiles, % | 1.73 | 0.67 | 1.92 | 1.08 |
| Ash, % | 0 | 0 | 0 | 0 |
| Cold Flow | 0 | 0 | 5.03 | 0.11 |
| Tg, °C. | −65.4 | −62.9 | −58.5 | −63.2 |

EXAMPLES 8–10

In tis series of experiments, a styrene-isoprene-butadiene terpolymer was prepared utilizing the equipment and general technique described in Example 1. The operating conditions utilized in the polymerization and the properties of the styrene-isoprene-butadiene terpolymer produced are reported in Table II.

TABLE II

| Example | 8 | 9 | 10 |
|---|---|---|---|
| Monomer Concentration | 90% | 90% | 90% |
| Styrene/Isoprene/Butadiene Ratio | 20/40/40 | 20/40/40 | 20/40/40 |
| Startup Temperature | 213° F. | 135° F. | 155° F. |
| Reflux Pressure, psig | 82 | 110 | 108 |
| Reflux Temperature | 160° F. | 180° F. | 170° F. |
| Lbs. Premix/Hour | 35.0 | 56.0 | 50.0 |
| Lbs. Monomer/Hour | 31.5 | 50.4 | 45.0 |
| n-Butyllithium, phm | 0.070 | 0.051 | 0.057 |
| Monomer Conversion, % | 98+ | 98+ | 98+ |
| Mooney (M/L-4) | 77 | 29 | 67 |
| DSV Gel, % | 43.41 | 8.97 | 16.35 |
| DSV | 1.33 | 1.27 | 1.96 |
| Extractables, % | 2.26 | 2.37 | 1.94 |
| Volatiles, % | 0.13 | 0.43 | 0.27 |
| Ash, % | 0 | 0 | 0.02 |
| Cold Flow | 0 | 0.46 | 0 |
| Tg, °C. | −72.8 | −72.7 | −71.7 |

EXAMPLES 11–13

In this series of experiments, a styrene-isoprene copolymer was prepared utilizing the equipment and general technique described in Example 1. The operating conditions utilized in the polymerization and the properties of the styrene-isoprene copolymers produced are reported in Table III.

TABLE III

| Example | 11 | 12 | 13 |
|---|---|---|---|
| Monomer Concentration | 90% | 90% | 92% |
| Styrene/Isoprene Ratio | 40/60 | 40/60 | 40/60 |
| Startup Temperature | 190° F. | 185° F. | 190° F. |
| Reflux Pressure, psig | 38 | 38 | 40 |
| Reflux Temperature | 191° F. | 185° F. | 190° F. |
| Lbs. Premix/Hour | 51.0 | 50.0 | 50.0 |
| :bs. Monomer/Hour | 45.9 | 45.0 | 46.0 |
| n-Butyllithium, phm | 0.051 | 0.032 | 0.048 |
| Modifier, TMEDA, phm | 0 | 0 | 0.02 |
| Monomer Conversion, % | 98+ | 98+ | 94 |
| Mooney (M/L-4) | 30 | 52 | 46 |
| DSV Gel, % | 1.62 | 1.03 | 0.92 |
| DSV | 1.43 | 1.94 | 1.52 |
| Extractables, % | 2.66 | 2.49 | 0 |
| Volatiles, % | 0.67 | 0.68 | 0.31 |
| Ash, % | 0.02 | 0.08 | 0.01 |
| Cold Flow | 0 | 0 | 0 |
| Tg, °C. | −57.7 | −59.9 | −52.4 |

While certain representative embodiments and details have been shown for the purpose of illustrating the present invention, it will be apparent to those skilled in this art that various changes and modifications can be made therein without departing from the scope of the invention.

What is claimed is:

1. A process for the synthesis of polydiene rubber by continuous high solids solution polymerization which comprises: (1) continuously charging at least one diene monomer, at least one organolithium compound, and from about 4 to about 50 phm of at least one organic solvent into a reaction zone wherein the reaction zone is in a reactor/extruder; (2) allowing the monomers to polymerize to a conversion of at least about 90% while utilizing conditions under which there is sufficient evaporative cooling in said reaction zone to maintain a temperature within the range of about 10° C. to about 150° C.; and (3) continuously withdrawing said polydiene rubber from the reaction zone.

2. A process as specified in claim 4 wherein the organo lithium compound is an organo monolithium compound.

3. A process as specirfied in claim 2 wherein the organo monolithium compound is selected from the group consisting of ethyllithium, isopropyllithium, n-butyllithium, sec-butyllithium, tert-octyllithium, n-eicosyllithium, phenyllithium, 2-naphthyllithium, 4- butylphenyllithium, 4-tolyllithium, 4-phenylbutyllithium and cyclohexyllithium.

4. A process as specified in claim 1 wherein said reactor/extruder is a self-cleaning reactor/extruder having a self-cleaning effect of at least about 90%.

5. A process as specified in claim 1 wherein there is sufficient evaporative cooling in said reaction zone to maintain a temperature within the range of about 50° C. to about 140° C.

6. A process as specified in claim 1 wherein said polydiene rubber is styrene-butadiene rubber and wherein the amount of organic solvent utilized is within the range of about 20 phm to about 40 phm.

7. A process as specified in claim 6 wherein the amount of organic solvent utilized is within the range of about 25 phm to about 30 phm.

8. A process as specified in claim 1 wherein the polydiene rubber is a copolymer of isoprene and butadiene and wherein the amount of organic solvent utilized is within the range of about 10 phm to about 30 phm.

9. A process as specified in claim 8 wherein the amount of organic solvent utilized is within the range of about 15 phm to about 25 phm.

10. A process as specified in claim 1 wherein the polydiene rubber is a copolymer of styrene and isoprene and wherein the amount of organic solvent utilized is within the range of about 5 phm to about 20 phm.

11. A process as specified in claim 10 wherein the amount of organic solvent utilized is within the range of 6 phm to about 15 phm.

12. A process as specified in claim 1 wherein said polydiene rubber is a terpolymer of styrene, isoprene, and butadiene: and wherein the amount of organic solvent utilized is within the range of about 4 phm to about 20 phm.

13. A process as specified in claim 12 wherein the amount of organic solvent utilized is within the range of about 6 phm to about 15 phm.

14. A process as specified in claim 1 wherein a conversion of at least about 96% is attained.

15. A process as specified in claim 1 wherein a conversion of at least about 98% is attained.

16. A process for the synthesis of polybutadiene homopolymer rubber by continuous high solids solution polymerization which comprises: (1) continuously charging 1,3-butadiene monomer, at least one organolithium compound, and from about 20 phm to about 50 phm of at least one organic solvent into a reaction zone; (2) allowing the 1,3-butadiene monomer to polymerize to a conversion of at least about 90% while utilizing conditions under which there is sufficient evaporative cooling in said reaction zone to maintain a temperature within the range of about 10° C. to about 150°C.; and (3) continuously withdrawing said polybutadiene homopolymelr rubber from the reaction zone.

17. A process as specified in claim 16 wherein the amount of organic solvent utilized is within the range of about 30 phm to about 45 phm.

18. A process for the synthesis of polyisoprene homopolymer rubber by continuous high solids solution polymerization which comprises: (1) continuously charging isoprene monomer, at least one organolithium compound, and from about 10 phm to about 30 phm of at least one organic solvent into a reaction zone; (2) allowing the isoprene monomer to polymerize to a conversion of at least about 90% while utilizing conditions under which there is sufficient evaporative cooling in said reaction zone to maintain a temperature within the range of about 10° C. to about 150°C.; and (3) continuously withdrawing said polyisoprene homopolymer rubber from the reaction zone.

19. A process as specified in claim 10 wherein the amount of organic solvent utilized is within the range of about 15 phm to about 25 phm.

* * * * *